United States Patent [19]

Neininger et al.

[11] 4,301,453

[45] Nov. 17, 1981

[54] RADAR DEVICE FOR SIMULTANEOUSLY MEASURING DISTANCE AND RELATIVE SPEED

[75] Inventors: Günter Neininger, Ludwigsburg; Bernard Hahn, Stuttgart, both of Fed. Rep. of Germany

[73] Assignee: International Standard Electric Corporation, New York, N.Y.

[21] Appl. No.: 108,637

[22] Filed: Dec. 31, 1979

[30] Foreign Application Priority Data

Jan. 11, 1979 [DE] Fed. Rep. of Germany ....... 2900825

[51] Int. Cl.$^3$ .............................................. G01S 13/58
[52] U.S. Cl. .................................................. 343/9 R
[58] Field of Search ................................ 343/5 SW, 9

[56] References Cited

U.S. PATENT DOCUMENTS

| | | | |
|---|---|---|---|
| 3,952,303 | 4/1976 | Watanabe et al. | 343/9 |
| 4,079,377 | 3/1978 | zur Heiden | 343/9 |

Primary Examiner—Malcolm F. Hubler
Attorney, Agent, or Firm—William T. O'Neil

[57] ABSTRACT

In the radar device, the received signal is down-converted with three different signals prior to speed evaluation, so that three signals having different amplitudes are available for speed evaluation. Only the signal having the greatest amplitude is then evaluated, and this amplitude is always sufficiently great.

5 Claims, 7 Drawing Figures

RADAR DEVICE FOR SIMULTANEOUSLY MEASURING DISTANCE AND RELATIVE SPEED

BACKGROUND OF THE INVENTION

The present invention relates to a radar device as set forth in the preamble of claim 1. A radar device of this kind is disclosed in German Offenlegungsschrift (DE-OS) No. 25 14 868.

In the prior art device described therein, the doppler shift of the spectral line lying in the middle of a range interval is determined, it being assumed that this spectral line, both in the case of targets located at the extreme upper limit of the range interval and in the case of targets located at the extreme lower limit of the range interval, has a sufficient amplitude for further processing, i.e., for the determination of the doppler shift of this spectral line and, thus, for relative speed determination. It has turned out that this signal selection and processing results in losses of sensitivity at the limits of the range interval.

OBJECT

The object of the invention is to eliminate these losses of sensitivity at the limits of the range interval.

SOLUTION

This object is achieved by the means set forth in the claim. Further development are apparent from the subclaims.

ADVANTAGE

Relative speed to the targets can be determined very accurately in a complete range interval.

BRIEF DESCRIPTION OF THE DRAWINGS

The invention will now be explained in greater detail, by way of example, with reference to the accompanying drawings, in which.

DETAILED DESCRIPTION

Figure 1:
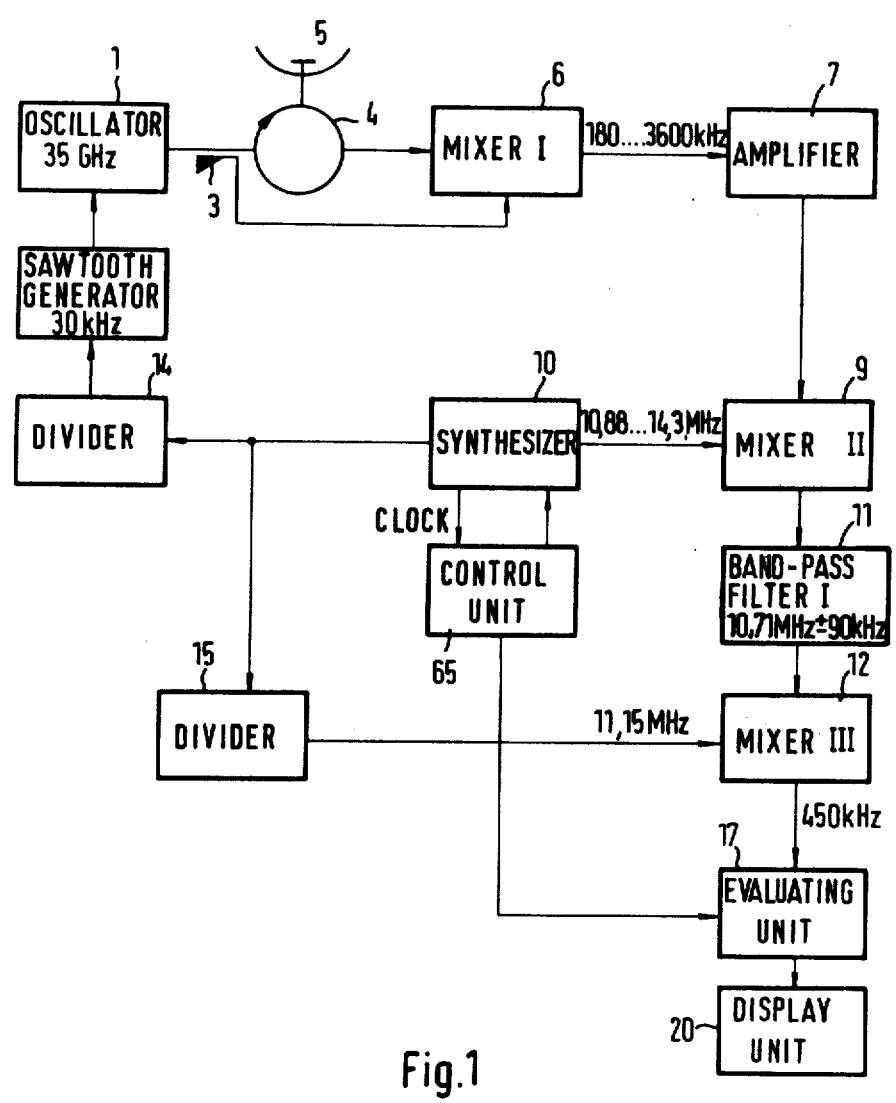
FIG. 1 is a block diagram of the prior art radar device.

At the outset, the prior art radar device disclosed in DE-OS No. 25 14 868 will be described with the aid of FIG. 1. In this figure, the same reference characters as in DE-OS No. 25 14 868 are used to designate parts having similar functions. The block diagram of this application differs from that of DE-OS No. 25 14 868 only in that a few parts not necessary to understand the invention have been omitted, while others have been combined or replaced by equivalent parts.

An RF signal (having a frequency of, e.g., 35 GHz) generated in an oscillator 1 is frequency-modulated with a signal generated in a sawtooth generator 2 (the modulation frequency $f_{mod}$ is, for example, 30 kHz). The frequency-modulated signal is fed to an antenna 5 via a circulator 4 and radiated by this antenna. The received signal is passed to a first mixer 6, which is also fed with a small portion of the transmitted signal coupled out by means of a directional coupler 3. Instead of the circulator 4 and the antenna 5, separate transmitting and receiving antennas may, of course, be used.

The output signals of the first mixer 6 having a frequency ranging between, e.g., 180 kHz and 3,600 kHz. They correspond to distances between 5 m and 100 m. The signals are amplifed in an amplifier 7 and fed to a second mixer 9. A synthesizer 10 supplies the mixer 9 with mixing signals each of which is assigned a given range interval. The frequencies of the mixing signals lie between, e.g., 10.88 and 14.3 MHz. The synthesizer is advanced in 180-kHz steps in response to signals from a control unit 65. The control unit 65 may be a counter, for example, which receives its clock pulses from the synthesizer. Synthesizers are generally known and, therefore, will not be described here. The counter may be for example the module identified as SN 74190 (manufactured by Texas Instruments Co., U.S.A.).

The output signal of the second mixer is applied to a first band-pass filter 11, whose bandwidth (e.g., 180 kHz) corresponds to the lengths of the range intervals. The center frequency of the filter 11 is 10.7 MHz, for example. At the output of the band-pass filter 11 a signal is present only if the signal fed to the second mixer 9 was mixed with the frequency allotted to the range interval within which the target is located. Thus, if the mixing frequency is known, the range interval in which the target is located will be known. Therefore, the control unit 65 also passes the information about the respective range interval to an evaluating unit 17. The output signal of the first band-pass filter 11 is down-converted in a third mixer 12 and fed to the evaluating unit 17. Distance and relative speed are displayed on a display unit 20.

To obtain the mixing signal for the third mixer, a signal provided by the synthesizer 10 is divided in a divider 15. A divider 14 also converts this signal provided by the synthesizer 10 to a signal at modulation frequency.

The invention concerns only speed evaluation. Therefore, reference to distance evaluation will now be made only as far as is necessary for an understanding of the speed evaluation.

Figure 2A:
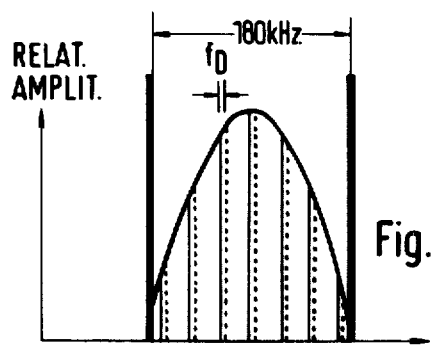
FIGS. 2a, 2b, 3a, 3b, and 3c frequency spectra to explain the operation of the prior art radar device and of the novel device.
Figure 2B:
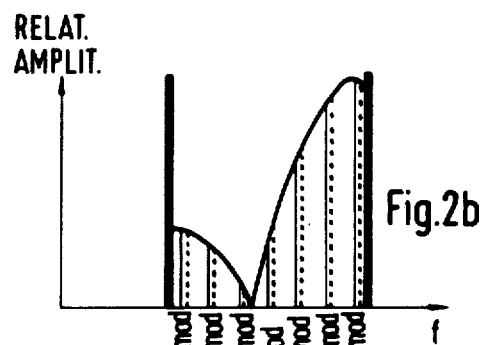

FIGS. 2a and 2b show the output signals of the first band-pass filter for two targets located at different distances. The signals consist of several spectral lines. Their envelope is also shown. The frequencies are integral multiples of the modulation frequency $f_{mod}$. The spectral lines for a target at zero relative speed are shown as solid lines, while those for a target moving at a speed other than zero are shown dotted. Those frequencies differ by the doppler frequency $f_D$, from which relative speed can be determined. The frequency at which the envelope has its maximum corresponds to the distance to the target.

In FIG. 2a, the bandwidth of the first band-pass filter 11 is indicated by the heavy lines. If distance is evaluated only to determine whether a target is located within this bandwidth or not, distance resolution is determined by the length (range increment) assigned to the bandwidth.

In FIG. 2b, a target at another distance is assumed. Unlike the target of FIG. 2a, which is in the middle of a range interval, it is located at the limit of a range interval. Since both targets are located within the same resolution range, the display unit 20 indicates the same distance for both targets.

As mentioned above, for a target moving at a relative speed not equal to zero, all spectral lines are shifted with respect to the multiples of the modulation frequency. Thus, to determine the doppler shift, a single spectral line can be picked out and its frequency can be measured. For the frequency measurement there are many known solutions, which will not be described here.

The difference between the measured frequency and the nominal frequency is the doppler shift $f_D$, which is directly proportional to the relative speed. It can be positive or negative.

The spectra of FIGS. 2a and 2b, as mentioned earlier, are output signals of the first band-pass filter 11, it being assumed that the filter has an imaginary rectangular pass-band characteristic. To permit favorable signal evaluation, in the prior art radar device, the output signals of the first band-pass filter 11 are converted to a lower frequency band by means of the third mixer 12. These signals are shown in FIG. 3. Both the spectra of FIG. 2 and those of FIG. 3 are merely qualatitive and do not provide quantitative representations.

Figure 3A:
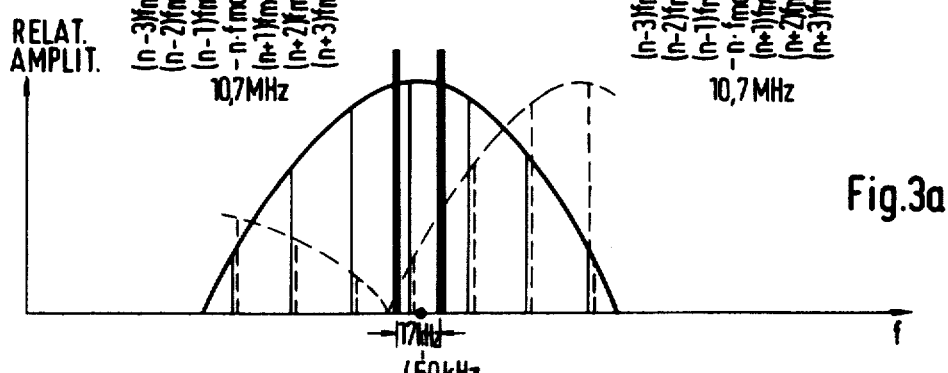

Down-conversion of the signals of FIGS. 2a and 2b give the spectra indicated in FIG. 3a by solid and broken lines, respectively. To determine the speed from the doppler shift of a single line, as in the identified prior art radar device, a band-pass filter filters out that frequency band around a single line which includes the expected doppler shifts. This frequency band is limited by the heavy lines.

If the target is located in the middle of a range interval (as in FIG. 2a), the filtered-out spectral line will have a relatively large amplitude. If, however, the target is located at the limit of a range interval, as in the example of FIG. 2b, the filtered-out spectral line will have a small amplitude. For evaluation, however, it would be desirable if a spectral line having a relatively large amplitude were available in all cases.

In the novel radar device according to the invention, therefore, the output signal of the first band-pass filter 11 is mixed not with only one signal but with three signals. The frequencies of these signals differ by, e.g., half the value of the pass-band of the first band-pass filter 11, which is allotted to one range interval. The signal obtained by down-converting the signal of FIG. 2b with the other mixing signals is shown in FIGS. 3b and 3c, respectively.

Figure 3B:
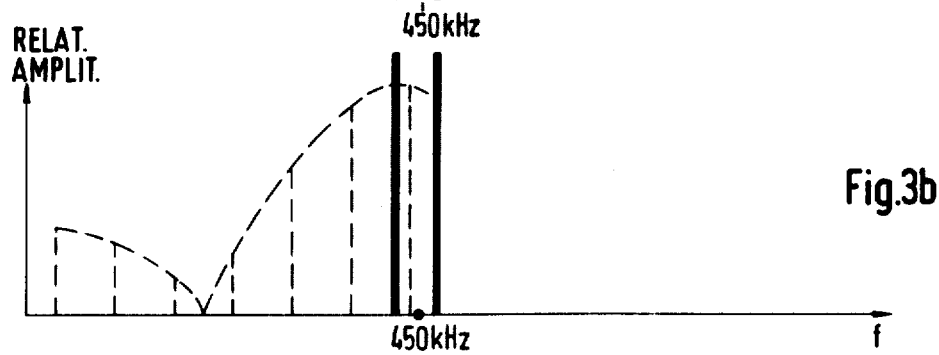
Figure 3C:
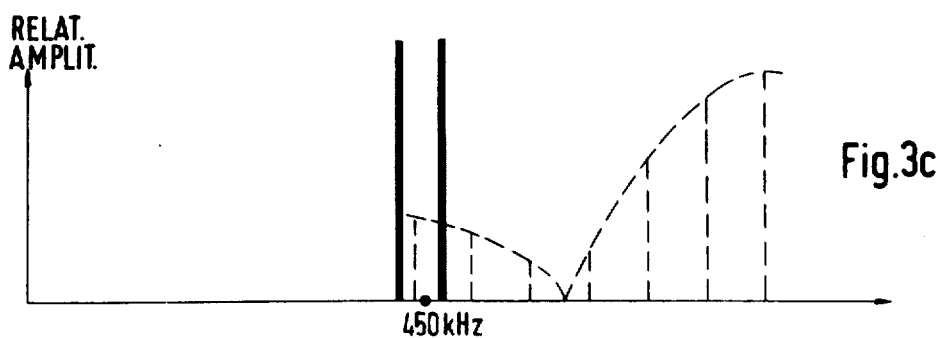

After down-conversion using three different frequencies which differ as stated above, three spectra are thus obtained whose envelopes and spectral lines are indicated by broken lines in FIGS. 3a to 3c. It can be seen that the three spectral lines whose doppler shift is to be evaluated have very different amplitudes. However, there is always one spectral line which has sufficient amplitude to permit satisfactory evaluation. In the present case, this is the spectral line of FIG. 3b.

Figure 4:
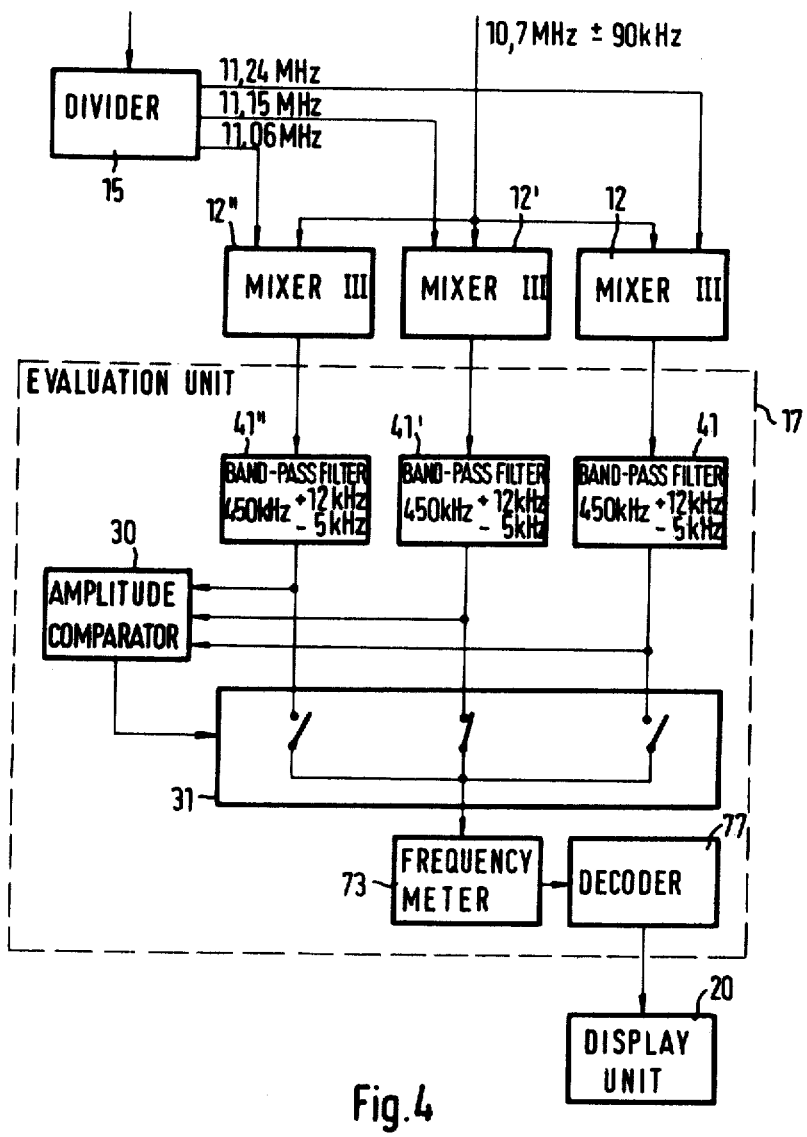
FIG. 4 is a block diagram showing those parts of the novel radar device which are essential for the invention.

Referring to FIG. 4, a circuit will now be explained in which the greatest amplitude spectral line, i.e., the line having the greatest amplitude, can be selected and evaluated.

In FIG. 4, the divider 15 of FIG. 1 generates three different mixing frequencies, e.g., 11.24 MHz, 11.15 MHz, and 11.06 MHz. Each mixing frequency is fed to a corresponding mixer 12, 12', 12", all third mixers being also supplied with the output signal of the band-pass filter 11.

The output signals of the mixers 12, 12', and 12" are fed to band-pass filters 41, 41', and 41", respectively, which are as similar as possible and whose passbands correspond to the expected doppler shifts of a spectral line. The band-pass output signals are fed to an amplitude comparator 30, which determines the spectal line having the greatest amplitude and controls a switching device 31 in such a way that only the band-pass output signal having the greatest amplitude is passed on to a frequency meter 73. A decoder 77 assigns to the measured frequency the correct relative speed, which is indicated in the display unit 20.

Alternatively, in lieu of mixing the output signal of the band-pass filter 1 with three mixing signals in three mixers simultaneously, it is possible to perform the three mixing processes successively. In this case, however, the mixer output signals for the amplitude comparison must be stored in a memory, which is then controlled so that the signal having the greatest amplitude is transferred to the frequency meter.

We claim:

1. In a radar system employing transmission of a sawtooth frequency-modulated signal and including apparatus for measurement of distance and relative speed to targets within a range to be monitored, said system including a first mixer and first source of local oscillator signal therefor, to generate a beat signal between a received signal and said frequency modulated transmission signal comprising:

first means for up-converting said beat signal to a first intermedate frequency range, said first means including a second mixer and a source of second local oscillator signal changing cyclically in steps within a period corresponding to the period of said modulating sawtooth, each step of said second local oscillator corresponding to a discrete range element within said range to be monitored, and a band-pass filter connected to the output of said second mixer the passband of said filter being substantially that of the frequency change during each of said local oscillator steps;

second means including a plurality of third mixer circuits each response to the output signals of said first means filter and to a corresponding one of a plurality of third local oscillator sources, said third local oscillator sources each providing a discrete frequency, said frequencies differing from each other by a fraction of the passband of said first means filter;

third means comprising plurality of second band-pass filters of substantially equal electrical characteristics, one of said second filters being connected to the output of each of said third mixers, each of said second filters having a pass-band corresponding to the expected doppler shift about its center frequency;

fourth means having a single output and being responsive to the outputs of said second filters to select the output signal of the one of said second filters having the greatest amplitude and to transmit said greatest amplitude signal to said single output;

and fifth means for determining the frequency of said greatest amplitude signals for correspondingly determining said relative speed.

2. Apparatus according to claim 1 in which the frequencies of said third local oscillators are selected such that said third mixers down-count.

3. Apparatus according to claim 1 in which said mixers of said second means are three in number.

4. A radar device using sawtooth-wave frequency modulation for contemporaneously measuring the distance and relative speed to targets within a range to be monitored, said device including a first mixer for generating a beat signal between a received reflected signal and the transmitted signal, wherein the range to be monitored is divided into a plurality of range intervals, wherein a second mixer mixes said beat signal with cyclically changing frequencies each corresponding to a discrete range interval, wherein said second mixer produces an up-conversion, wherein said second mixer is followed by a first band-pass filter whose passband is approximately equal to the bandwidth corresponding to a range interval, wherein distance is determined as a function of the mixing frequency at the instant a received signal is present at the output of said first band pass filter, and wherein speed measurement is effected by down-conversion of the output of said first band-pass filter and filtering out from said signal resulting from said down-conversion the frequency band about a spectral line which includes the doppler components proportional to relative speed by means of an additional band-pass filter, comprising:

third mixer means responsive to the output of said first band-pass filter discretely with three local oscillator signals of different frequency to provide three separate output signals of the same frequency but different amplitude;

selection means for determining the one of said separate output signals having a spectral line of the greatest amplitude;

and means responsive to said selection means for determining the doppler frequency of said greatest amplitude output signal.

5. A radar device according to claim 4 in which said third mixer local oscillator signals are spaced in frequency by not more than half of the bandwidth of said first band-pass filter, and in which three second band-pass filters having substantially the same characteristics are provided, one for each of said outputs to limit said output signals to the frequency of the corresponding spectral line and the doppler sidebands associated thereto.

* * * * *